United States Patent [19]

Aulmann

[11] Patent Number: 5,758,762
[45] Date of Patent: Jun. 2, 1998

[54] ELECTRICAL SWITCH

[75] Inventor: Manfred Aulmann, Schalksmühle, Germany

[73] Assignee: Schulte-Elektrotechnik GmbH & Co. KG, Ludenscheid, Germany

[21] Appl. No.: 751,500

[22] Filed: Nov. 18, 1996

[30] Foreign Application Priority Data

Nov. 28, 1995 [DE] Germany .................. 195 44 279.2

[51] Int. Cl.[6] .................................................. H01H 3/20
[52] U.S. Cl. .................... 200/332; 200/335; 200/318; 200/323
[58] Field of Search ........................ 200/332, 335, 200/331, 43.01, 330, 337, 332.1, 318, 318.1, 523, 528

[56] References Cited

U.S. PATENT DOCUMENTS

| | | | |
|---|---|---|---|
| 2,743,331 | 4/1956 | Lauder et al. | 200/332 |
| 4,394,553 | 7/1983 | Feil | 200/332 |
| 5,397,870 | 3/1995 | Noro | 200/335 |
| 5,428,197 | 6/1995 | McCurry et al. | 200/332 |

Primary Examiner—David J. Walczak
Attorney, Agent, or Firm—Edwin D. Schindler

[57] ABSTRACT

An electrical switch having a switching lever for actuating a slide which receives at least one contact bridge, and having an enabling slide which is active in the inserted position. The technical problem is to provide a switch whereof the switching lever only enables effective switching once the enabling slide is in the inserted position. Moreover, in the ON position, the switch is to have a hysteresis so that compensation movements of the switching lever are permissible. Finally, the contact bridge is to perform a sliding movement on the fixed contacts in order to clean the fixed contacts. The enabling slide has a bearing point for the switching lever which is active in the inserted position. A push rod (24) is guided linearly, is moved by the switching lever and comes into engagement with a profiled guide of the slide. In the ON position, on pivoting into a latching step, the slide and the contact bridge perform a transverse movement on the fixed contacts of the contact springs.

6 Claims, 6 Drawing Sheets

ELECTRICAL SWITCH

BACKGROUND OF THE INVENTION

1. Field of the Invention

The invention relates to an electrical switch having a switching lever for actuating a slide which receives at least one contact bridge, and having an enabling slide which is active in the inserted position.

2. Description of the Prior Art

EP O 466 306 B1 describes a switch of the type mentioned at the outset, in particular for lawn mowers. In devices of this type, the regulations require that the drive motor can only be switched on when two mutually independent switching movements are performed. The generic arrangement has a switching lever for the switching-on actuation and an enabling slide which enables the power circuit. Since both switching elements are independent of one another both mechanically and electrically, with the switching lever locked, switching actuation can take place by the enabling slide alone. This is impermissible.

SUMMARY OF THE INVENTION

The object of the invention is to provide a switch whereof the switching lever only allows effective switching when the enabling slide is in the inserted position. Moreover, in the ON position, the switch is to have a hysteresis so that compensating movements of the switching lever are permissible. Finally, the contact bridge is to perform a sliding movement on the fixed contacts in order to clean the fixed contacts.

According to the invention, this object is achieved in that the enabling slide has a bearing point for the switching lever which is active in the inserted position, in that a push rod is guided linearly, is moved by the switching lever and comes into engagement with a profiled guide of the slide, and in that, in the ON position, on reaching a latching step the slide and the contact bridge perform a transverse movement on the contact coatings.

The invention differs from the prior art in that, for actuation of the switch, the enabling slide must first be put into the inserted position. The switching lever is then actuable, and switches the slide by way of a push rod and profiled guides. As a result of the slide latching in the ON position, by means of the profiled guides a hysteresis is achieved so that compensating movements of the switching lever are possible in the ON position. The pivoting on latching results in a transverse movement of the slide so that the contact bridge also performs transverse movements on the contact coatings, and brings about a cleaning of the contacts.

The switching lever, which is pivotal about various axes, can be guided securely in that pegs of the switching lever are guided in a heart-shaped profile track.

Isolation is achieved in that a chamber receiving the enabling slide is open in the plane of pivoting of the switching lever.

A simple and secure isolating function is achieved in that a chamber receiving the enabling slide is open in the plane of pivoting of the switching lever.

It is possible to guide the slide in a straight line and pivot it for latching in that pins about which the slide is pivotal and lugs are provided for guidance and cooperate with guide walls and latching steps.

A secure and stable latching is achieved in that the profiled guide is constructed such that during the switching-on movement the push rod exerts a moment of rotation on the slide in the direction of latching of the lugs.

Switching off is achieved in that during the switching-off movement a lug of the push rod comes into engagement with a profiling of the slide.

BRIEF DESCRIPTION OF THE DRAWING

An example embodiment of the invention is explained in relation to the drawings, in which:

FIG. 5 shows the preparatory position for switching on, and

DESCRIPTION OF THE PREFERRED EMBODIMENTS

Figure 1:
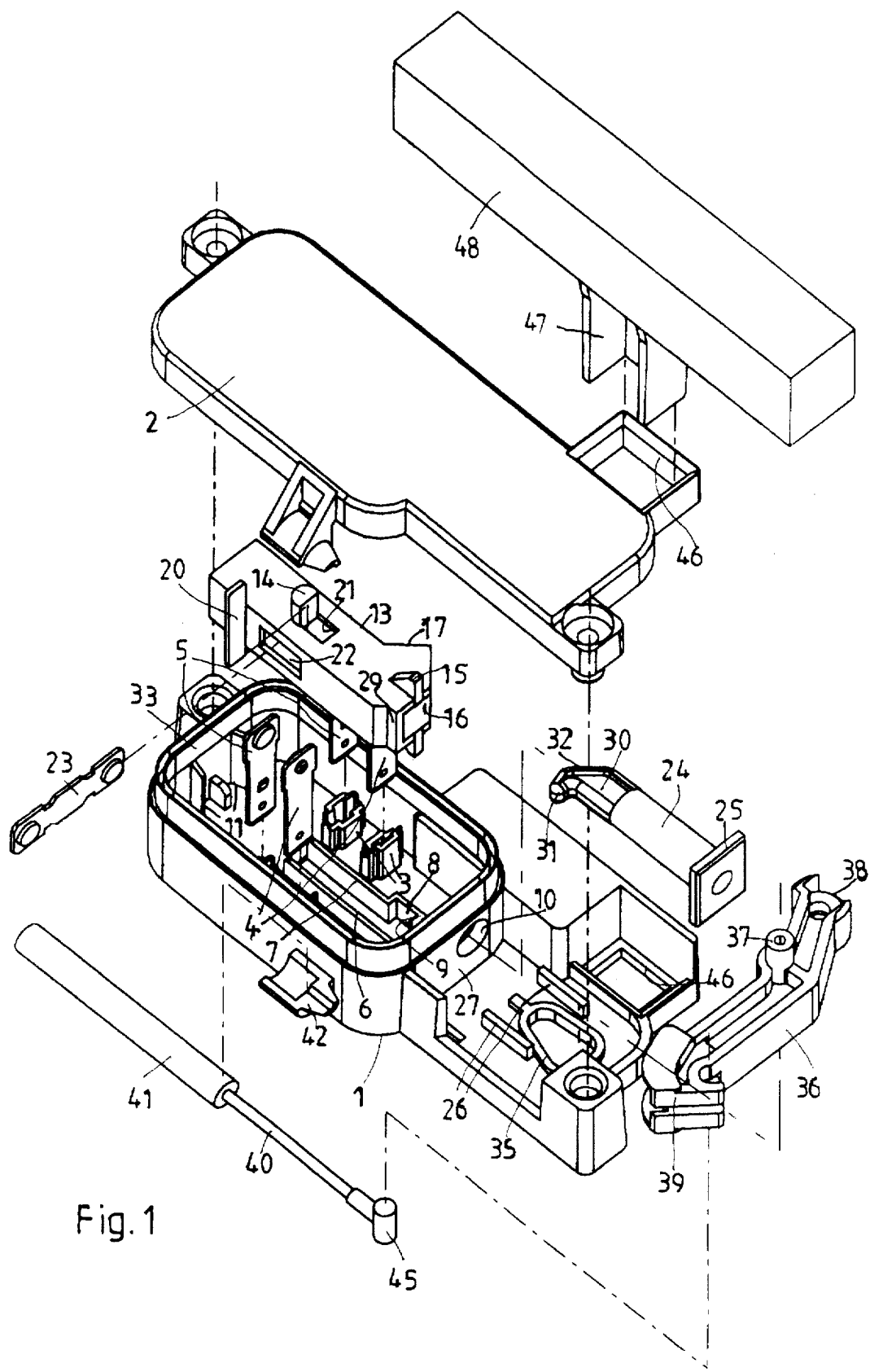
FIG. 1 shows an exploded illustration of the switch.

The electrical switch is accommodated in a housing 1 which is closed off by a housing cover 2, illustrated only in FIG. 1. Receivers 3 for paired contact springs 4, 5 having fixed contacts are provided in a chamber in the housing 1. In the base of the housing 1 and, arranged in mirror symmetry (not illustrated), on the inside of the housing cover 2 there are arranged guide walls 6, 7. The guide wall 7 has a recess 8 for the shaping of a latching step 9. In an intermediate wall 27 of the housing 1, adjacent to the latching step 9, there is a guide passage 10. The opposing short side 33 of the housing 1 has a receiver 11 for a helical spring 12 (not illustrated in FIG. 1).

A substantially right-angled slide 13 lies between the housing 1 and the housing cover 2 on the guide walls 6 and 7. Pins 14 and lugs 15 project upwards and downwards from the slide 13. The pins 14 lie between the guide walls 6 and 7 and on the one hand, together with the lugs 15, serve to guide the slide 13 in a straight line, and on the other hand serve as a pivot axis when the slide 13 is latched in. For latching in the ON position, the lugs 15 cooperate with the latching steps 9, as will be described in detail below. A side wall 34 of the slide 13 has a cutout 16 and an inclined profiled wall or profiled guide 17. The opposing inner wall of the slide 13 has an internal profiling 29.

A transverse wall 18 of the slide 13 supports a further helical spring 19. The helical spring 19 is supported at the other end against a plate 20 which passes through slots 21 adjoining the pins 14. Further slots 22 are provided in the side walls of the slide 13, and a contact bridge 23 against which the spring 12 is supported passes through these.

Direct actuation of the slide 13 is performed by a push rod 24 which is guided in the passage 10. An end plate 25 of the push rod 24 is moreover guided between walls 26 of the housing 1 and the housing cover 2. A helical spring 28 is supported against the intermediate wall 27 and the end plate 25 and surrounds the push rod 24. The base end of the push rod 24 has a lug 31 and a profiled surface 32 whereof the inclination substantially corresponds to the inclination of the profiled wall 17 of the slide 13. The lug 31 cooperates with the profiling 29 on switching off.

Oval-shaped profile tracks 35 are made in the base wall of the housing 1 and, correspondingly, in mirror symmetry in the housing cover 2. Pegs 37 of a switching lever 36 engage in the profile tracks 35 and are freely movable within the latter. The switching lever 35 terminates, in the one arm, in a roller cylinder 38 and, in the other arm, in a hook 39.

A peg 45 of a draw element 40 of a Bowden cable 41 is suspended in the hook 39. The Bowden cable 41 is supported in a fitting 42 on the housing 1. The Bowden cable 41 is connected by means of an actuating lever (not illustrated) to the shaft of a lawn mower. Between the fitting 42 and a receiver 43 of the switching lever 36 there is supported a helical spring 44 which biases the switching lever 36 into the OFF position of the switch.

The housing 1 and the housing cover 2 form a further chamber 46 into which an enabling slide 47 of a key 48 may be pushed. The enabling slide 47 has a U-shaped profile which serves as a roller bearing for the roller cylinder 38 of the switching lever 36. The chamber 46 is open in the plane in which the switching lever 36 pivots.

Figure 2:
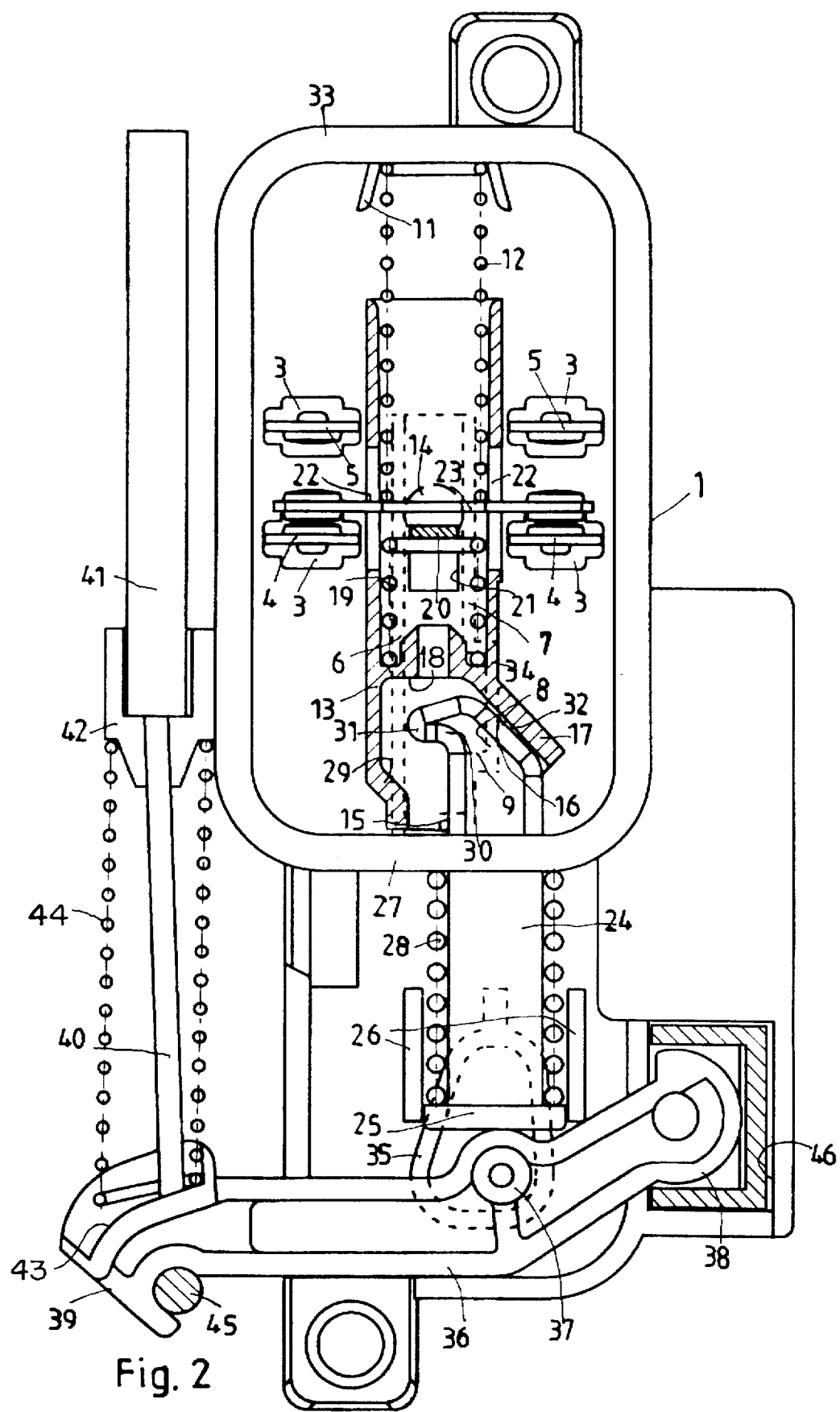
FIG. 2 shows the functional parts of the switch in the OFF position.

The function of the switch is explained with reference to FIGS. 2 to 6. FIG. 2 shows the switch in the OFF position. The enabling slide 47 is in the inserted position, so that the roller cylinder 38 of the switching lever 36 is inside the U-shaped profile of the enabling slide 47. The switching lever 36 is thus pivotal within the roller bearing formed by the enabling slide 47. The profile track 35 permits a corresponding movement of the switching lever 36. The switch is thus prepared for switching on. The fixed contacts of the contact springs 4 are break contacts, and are for example part of a braking circuit.

Figure 3:
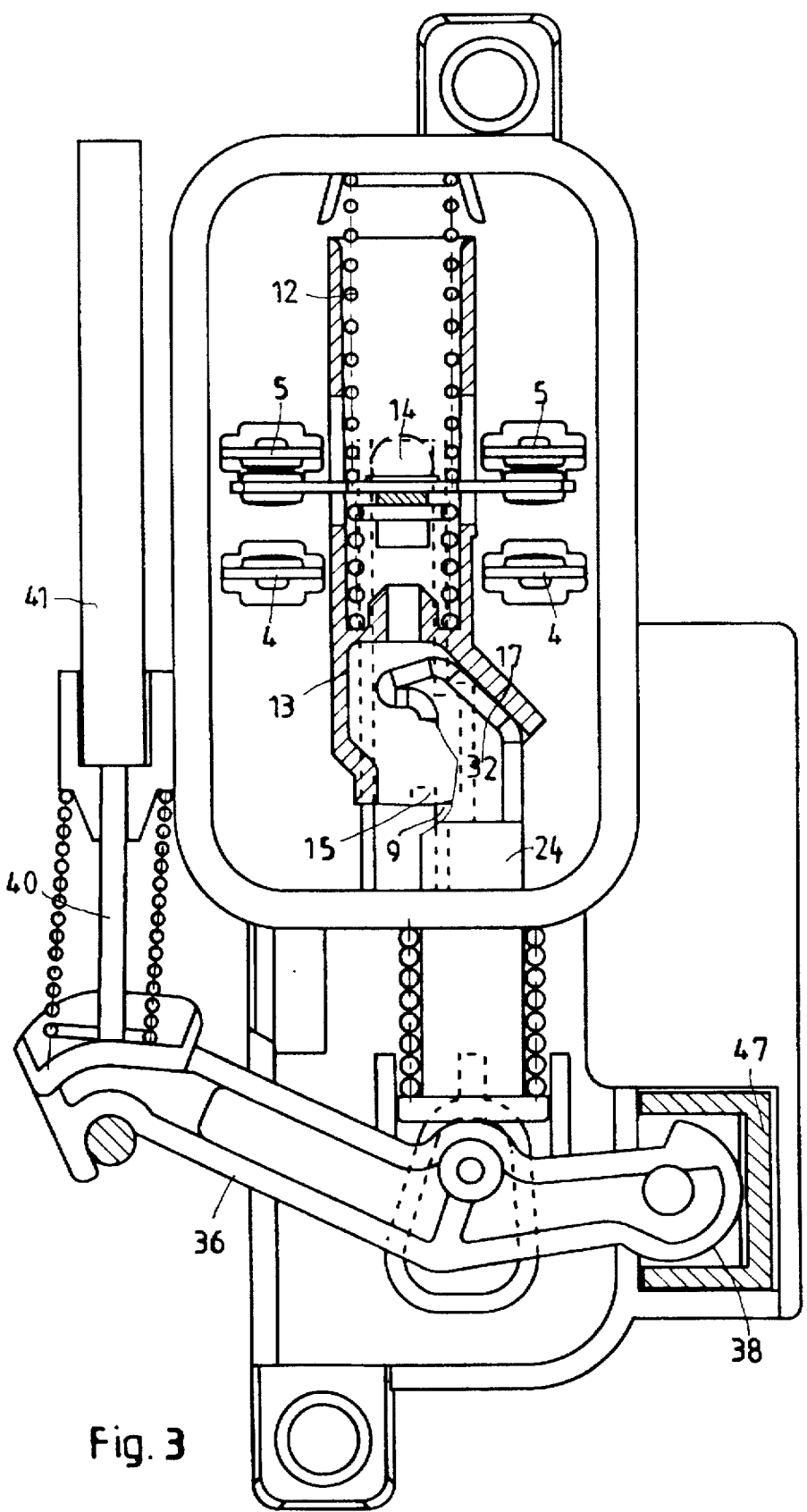
FIG. 3 shows them in the ON position.

To switch on, the actuating lever (not illustrated) of the Bowden cable 41 is actuated, so that by way of the draw element 40 the switching lever 36 is pivoted clockwise into the ON position, as in FIG. 3. The profiled surface 32 of the push rod 24 comes into engagement with the profiled wall 17 of the slide 13. The slide 13 is pushed in the opposite direction to the action of the helical spring 12 until the lugs 15 finally come to a stop in front of the latching steps 9. The contact bridge 23 bridges the contact springs 5.

Figure 4:
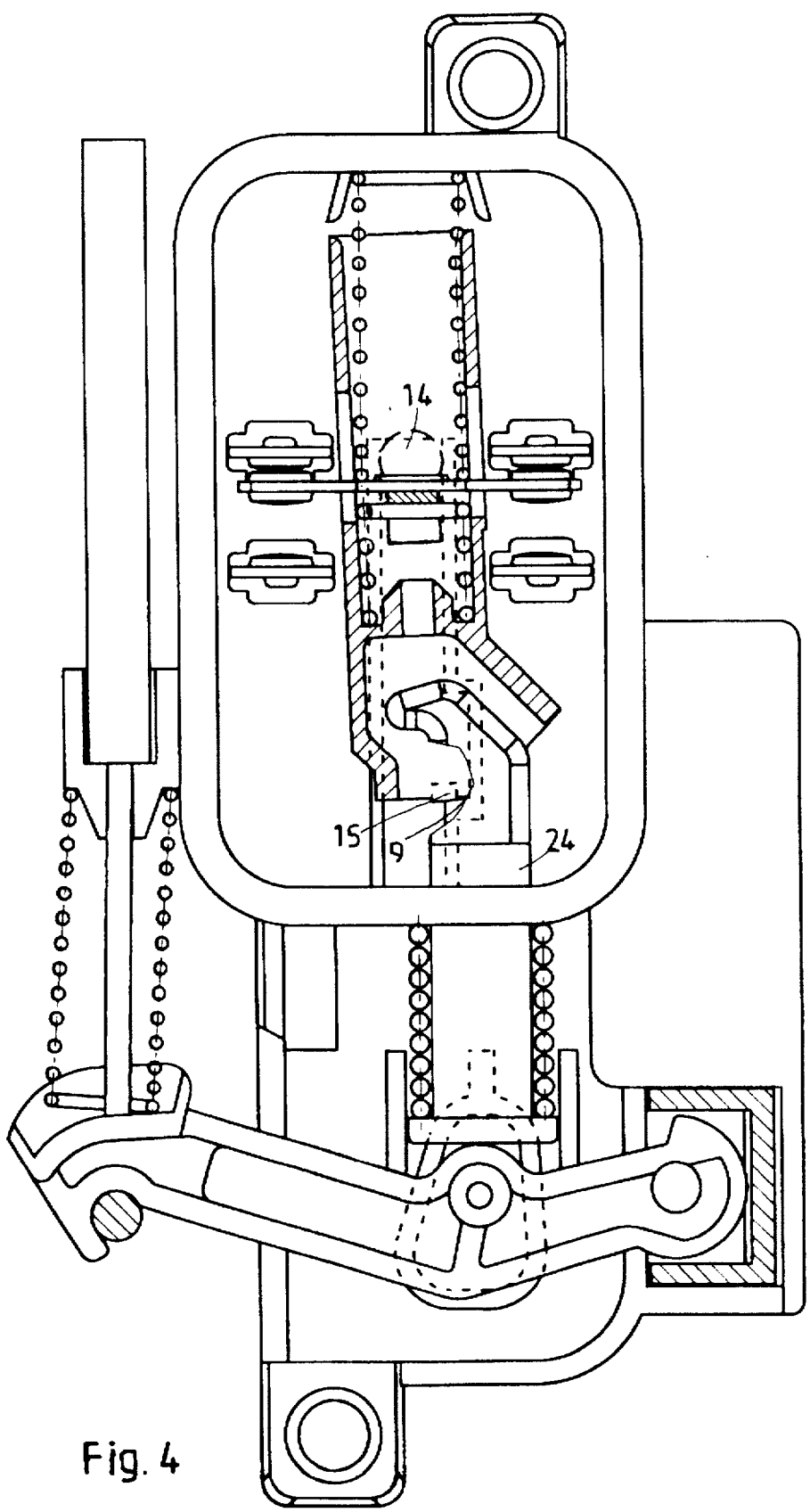
FIG. 4 shows the hysteresis function in the ON position.

Since the line of action of the push rod 24 intersects the axis of the pins 14, as the push rod 24 continues to act on the profiled wall 17, a moment of rotation anti-clockwise about the pins 14 becomes effective, so that the lugs 15 pivot inwards and latch against the latching steps 9. The slide 13 is latched in the position shown in 4, so that secure and constant contacting is ensured. In this ON position, the switch has a hysteresis, as also shown in FIG. 4. The push rod 24 can move freely within the slide 13 without releasing the latching. Compensation movements of the actuating lever are thus permissible.

Figure 5:
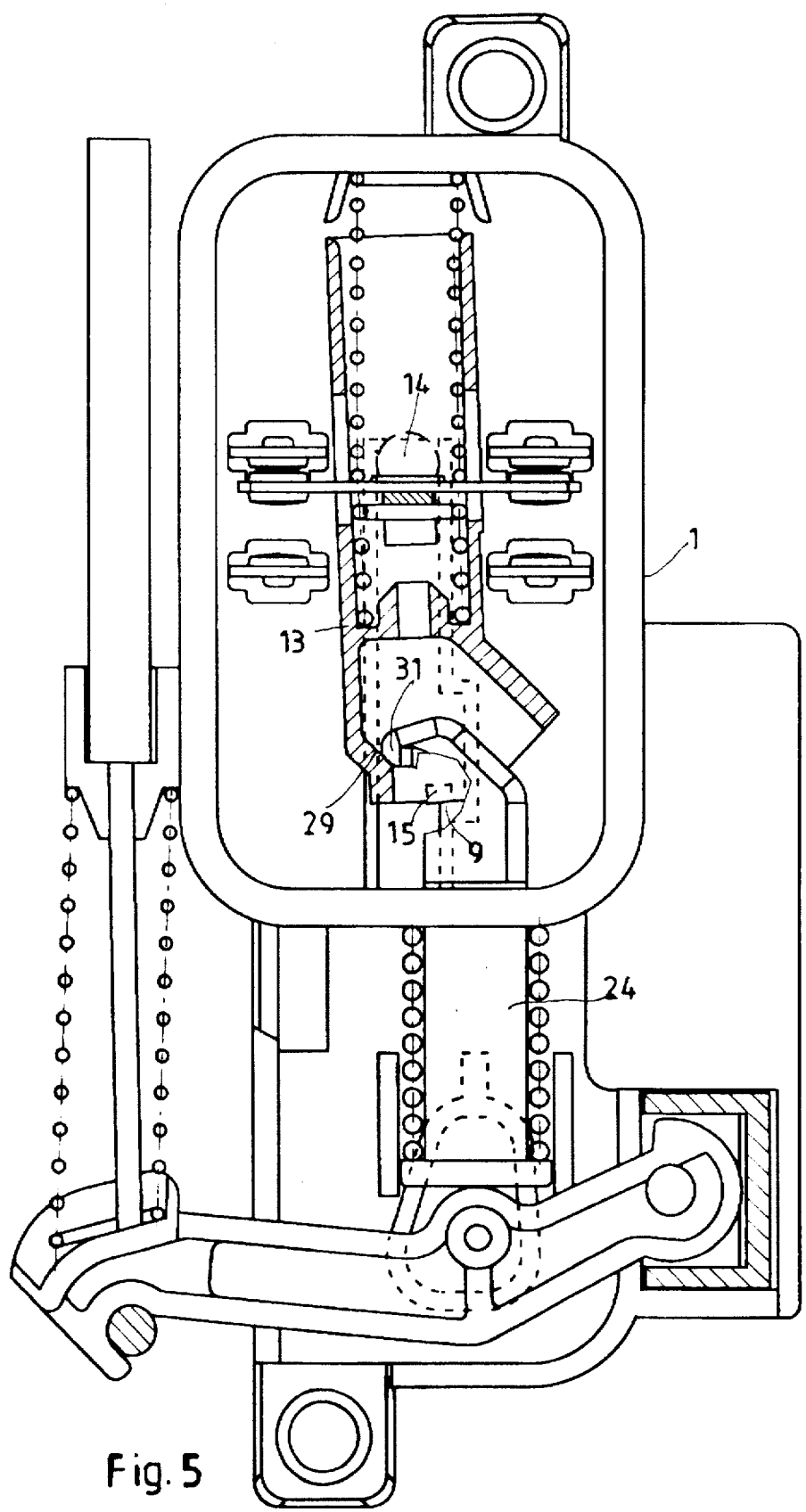

If, in accordance with FIG. 5, the lug 31 of the push rod 24 comes into engagement with the profiling 29 of the slide 13, then the slide 13 will pivot clockwise about the pins 14. This releases the lugs 15 from the latching steps 9. The spring 12 becomes effective and moves the slide 13 into the OFF position.

Every time there is a pivotal movement into the latching position, the contact bridge 23 is also displaced, so that there is a sliding movement of the contact coatings against one another. This has the effect of cleaning the contacts. The contact behaviour is thus substantially improved.

Figure 6:
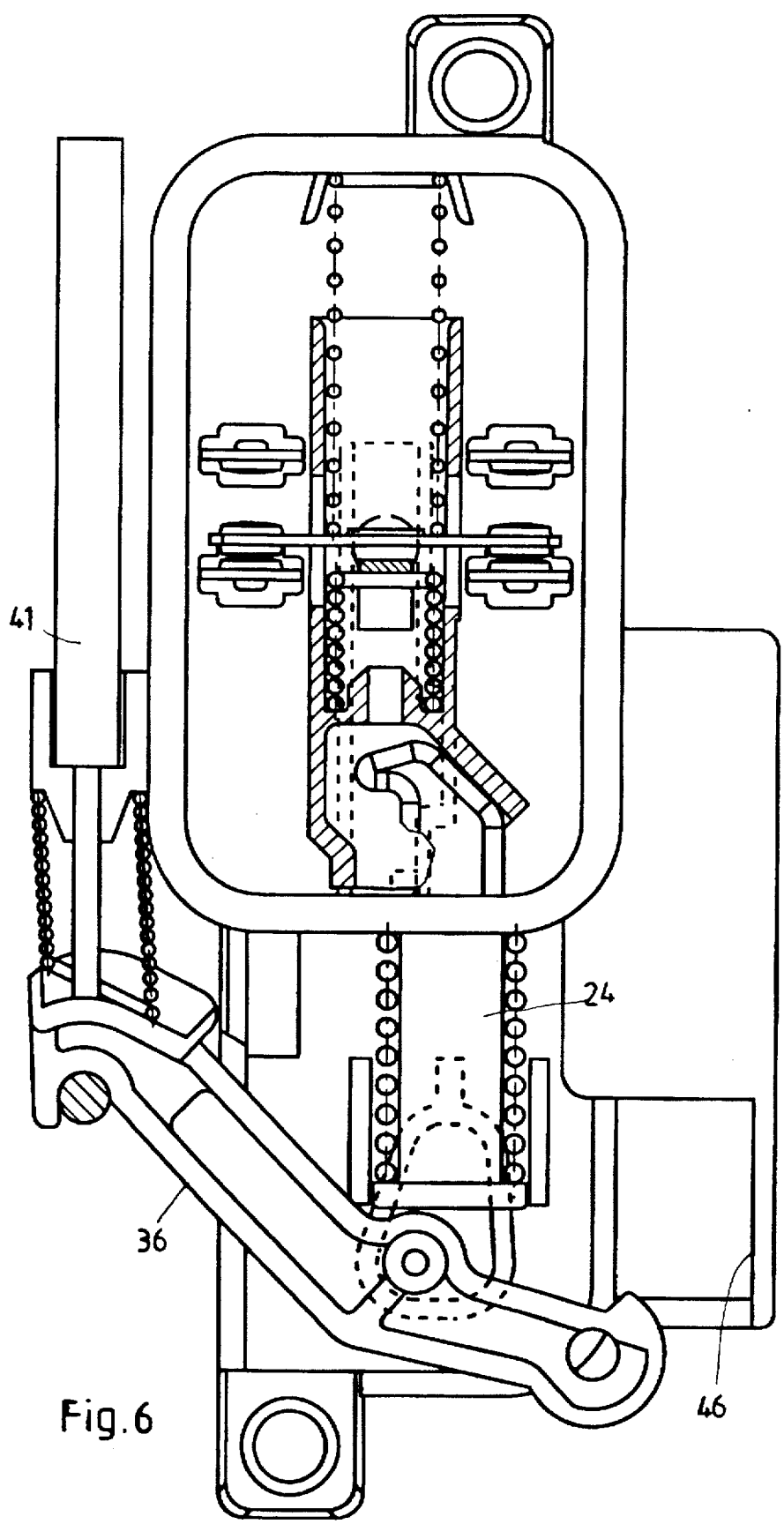
FIG. 6 shows the isolating function.

FIG. 6 shows the isolating function of the switch. The enabling slide 47 is pulled so that the chamber 46 is laterally open in the plane of pivoting of the switching lever 36. When the Bowden cable 41 is actuated, the switching lever 36 can pivot freely. There is no actuation of the push rod 24.

I claim the following:

1. An electrical switch having an ON position and an OFF position, comprising a slide and a switching lever for actuating said slide, said slide receiving at least one contact bridge cooperating with fixed contacts of contact springs, an enabling slide moveable to an inserted position so that said enabling slide in the inserted position is effective as a bearing point for said switching lever, and a linearly guided push rod moved by the switching lever, wherein said push rod during a switching-on movement comes into engagement with a profiled guide of said slide whereby in the ON position, said slide is pivoted into a latching step to maintain said switch in said On position and said contact bridge performs a transverse movement on the fixed contacts of the contact springs.

2. The electrical switch according to claim 1, wherein said switching lever includes pegs which are guided in an oval-shaped profile track.

3. The electrical switch according to claim 1, further comprising a chamber having a roller cylinder bearing therein, said chamber being able to receive said enabling slide with said chamber being open on one side wall through which said switching lever extends so that said switching lever is pivotable in a pivoting plane extending perpendicularly to an axis of the roller cylinder bearing in said chamber.

4. The electrical switch according to claim 1, wherein said slide is pivoted about pins, which are guided between guide walls.

5. The electrical switch according to claim 4, wherein the profiled guide of said slide is constructed so that during the switching-on movement, said push rod exerts a moment of rotation on said slide in order to latch a plurality of lugs.

6. The electrical switch according to claim 5, wherein during a switching-off movement, a lug of said push rod comes into engagement with a profiling of said slide.

* * * * *